United States Patent [19]

Morton et al.

[11] 4,119,898

[45] Oct. 10, 1978

[54] PULSE CONTROLLERS

[75] Inventors: John Morton; Keith Drummond Stevens, both of Stockport, England

[73] Assignee: Cableform Limited, Stockport, England

[21] Appl. No.: 753,137

[22] Filed: Dec. 22, 1976

[30] Foreign Application Priority Data

Dec. 24, 1975 [GB] United Kingdom ............... 52782/75

[51] Int. Cl.² .............................................. H02P 5/00
[52] U.S. Cl. ..................................... 318/341; 318/331; 318/345 G; 318/332
[58] Field of Search ............... 318/331, 332, 341, 432, 318/433, 434, 345 A, 345 G

[56] References Cited

U.S. PATENT DOCUMENTS 3,582,745   6/1971   Eguchi ................................. 318/341

Primary Examiner—Robert K. Schaffer
Assistant Examiner—Michael K. Mutter
Attorney, Agent, or Firm—Sughrue, Rothwell, Mion, Zinn and Macpeak

[57] ABSTRACT

A controller for a series electric motor is described of the type comprising means for applying D.C. pulses to the motor and means for controlling the mark/space ratio of the pulses applied to the motor. The current through the motor is sensed and the maximum mark/space ratio which may be applied to the motor is reduced when the motor current is below a predetermined limit to avoid overspeed in light load conditions.

6 Claims, 7 Drawing Figures

PULSE CONTROLLERS

The present invention relates to controllers for controlling series electric motors.

Series electric motors have characteristics such they they can be caused to overspeed when operating on light loads. This problem can be overcome by the addition of a shunt field winding to produce a compound motor.

Motor controllers have now been developed in which a thyristor is alternately rendered conductive and non-conductive so as to apply DC pulses to the motor, the power supplied to the motor being controlled by adjusting the frequency and/or duration, that is the mark/space ratio, of the pulses.

Series motors are ideally suited to control by DC pulse controllers, but if a shunt winding is added to the series motor to avoid light load overspeed transformer effects occur between the field windings during pulsing. A back EMF generated as a result of the presence of the shunt field can also effect commutation of the main thyristor.

It is an object of the present invention to obviate or mitigate the problems associated with series motors as described above.

According to the present invention there is provided a controller for a series electric motor, comprising means for applying D.C. pulses to the motor, means for controlling the mark/space ratio of the pulses applied to the motor, means for sensing the current through the motor, and means for reducing the maximum mark/space ratio which may be applied to the motor when the motor current is below a predetermined limit.

Preferably, the maximum mark/space ratio reducing means is effective to make the maximum mark/space ratio proportional to motor current when the current is below the said predetermined limit.

The reducing means may comprise a transistor controlled by a signal responsive to motor current, the transistor controlling current through a resistor the potential difference across which is utilized as an input to the mark/space ratio controlling means.

In one embodiment, the resistor comprises the track of a potentiometer the wiper of which is connected to the mark/space ratio controlling means.

In a second embodiment, the resistor is of a fixed ohmic resistance, and a potentiometer is provided with its track connected across a fixed potential, the potential appearing across said resistor and the potential at the wiper of the potentiometer being applied alternately via respective diodes to the input to the mark/space ratio controlling means.

The motor current may be sensed by determining the potential developed across a low ohmic value resistor in series with the motor.

Embodiments of the present invention will now be described, by way of example, with reference to the accompanying drawings, in which.

Figure 1:
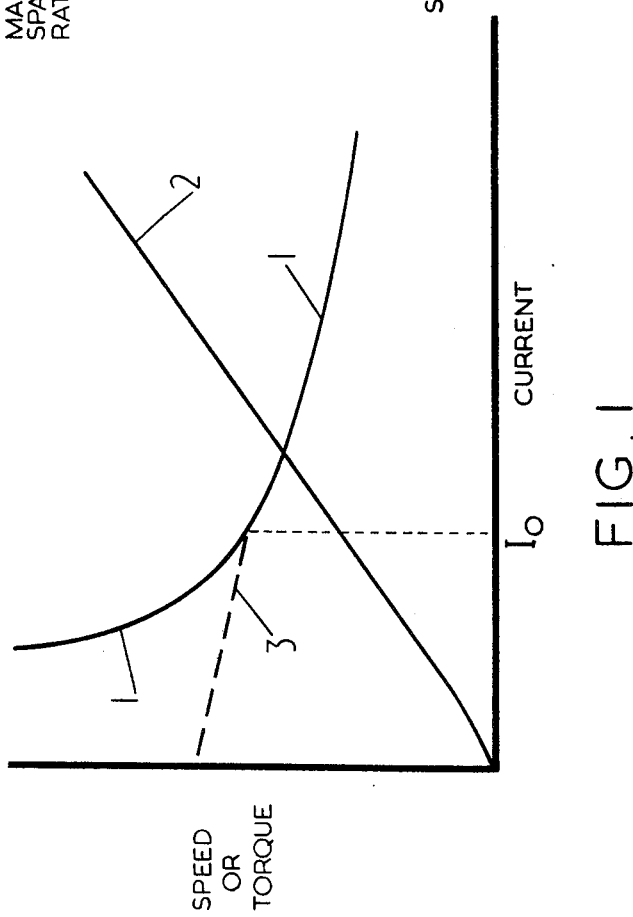
FIG. 1 is a diagram illustrating the operation of a series electric motor when controlled conventionally and when controlled in accordance with the present invention.

Referring to FIG. 1, the diagram illustrates the relationship between motor current in a series motor and speed (curve 1) and torque (curve 2). As may be seen the motor speed can increase sharply in low motor current and light load conditions. In order to avoid possible overspeeding it is desirable to modify the current/speed characteristic to follow curve 3 at currents below a predetermined current Io rather than the curve 1, and the controller illustrated in FIG. 2 provides this modification.

Figure 2:
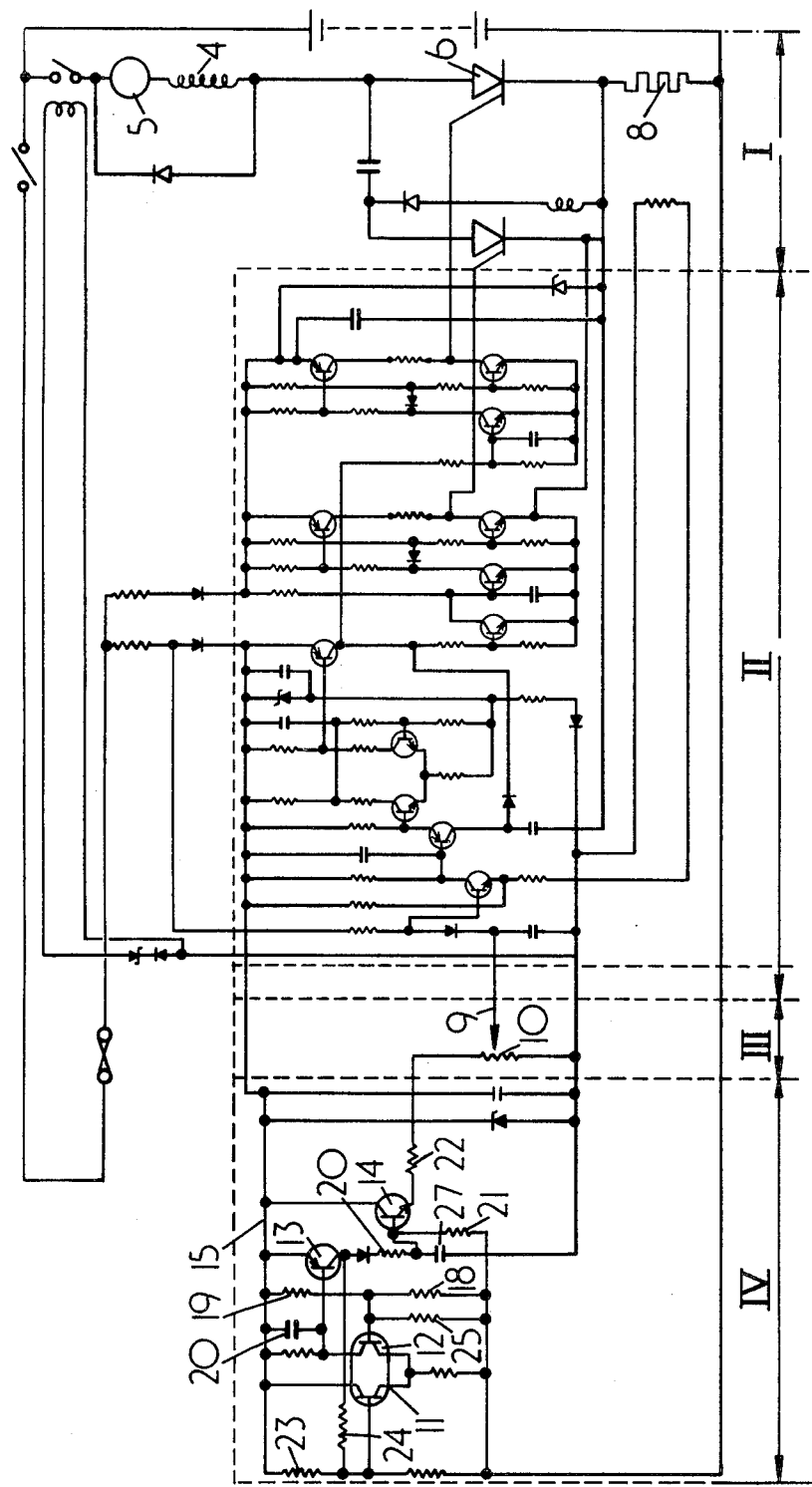
FIG. 2 is a circuit diagram of a controller according to the present invention.

Referring to FIG. 2, the illustrated controller is divided into a first section I comprising a battery, a series motor and a DC thyristor switch, a second section II for controlling the DC switch, a third section III for providing a demand signal to section II, and a fourth section IV for modifying the demand signal in low motor current conditions.

Section I operates in a manner described in our British patent specification No. 1,328,800, and effectively applies DC pulses to a series motor having a field 4 and armature 5. The pulsing is controlled by a main thyristor 6 and a commutating thyristor 7 the gates of which receive out of phase square-wave pulse trains from section II. A low ohmic value resistor 8 is connected in series with the motor and thyristor 6.

Section II is operative to supply the pulse trains to thyristors 6 and 7 so as to provide DC pulses to the motor the mark-space ratio of which depends upon a demand signal from section III. Section II also limits the maximum current through the motor in a manner described in our British patent specification No. 1,330,131.

In Section III, the demand signal is derived from the wiper 9 of a potentiometer having a track 10. The potentiometer may be controlled for example by a foot pedal on a vehicle driven by the motor. The maximum demand signal is limited to the potential developed across the track 10, which in turn depends upon the current passing through the track from section IV.

Section IV comprises a balanced pair of transistors 11, 12 an intermediate transistor 13 and an output transistor 14. Each of the transistors is connected by suitable bias resistors between positive rail 15 and a rail 16 which is connected to a point between the thyristor 6 and resistor 8 in Section I, the emitter of transistor 14 being connected to the rail 16 through the track 10 of the potentiometer. The base of transistor 11 is connected via resistor 17 to a point between the resistor 8 and the negative terminal of the battery in section I.

When no current passes through the resistor 8, the bias applied to the base of transistor 12 by resistors 18, 19 causes it to conduct while transistor 11 is held off as no potential is developed across the resistor 8 of section I. Conduction of transistor 12 turns on transistor 13 so that current is drawn through the transistor 13 and resistors 20, 21. The ohmic value of resistor 20 is much lower than that of resistor 21, and therefore the voltage developed across the resistor 20, which is applied between the collector and base of transistor 14, is low. The transistor 14 thus conducts but presents an impedance to current passing through it and a resistor 22 to the track 10. The voltage developed across the track is thus less than that which would appear if transistor 14 were saturated.

When current passes through the motor, a voltage is developed across the resistor 8. As this voltage increases, the transistor 11 is turned on, reducing the current passing through transistor 12 and thus raising the potential of the base of transistor 13. The impedance presented by transistor 13 therefore increases with motor current, and at a predetermined motor current Io the transistor 13 turns off.

When the transistor 13 is wholly or partially turned off, the voltage applied to the base of transistor 14 depends upon the resistance values of the potential divider formed by resistors 23, 24, 20 and 21. The transistor 14 is arranged to be turned on progressively as the transistor 13 turns off, and thus the potential developed across the track 10 of the potentiometer increases from a minimum when the motor current is zero to a maximum when the motor current is equal to or exceeds Io.

A resistor 25 may be connected in parallel with the resistor 18 and selected on test to adjust the bias on transistor 12 so as to obtain a desired turn-off point for that transistor. The value of Io may thus be adjusted.

Capacitors 26, 27 provide smoothing to ensure that the potential developed across the track 10 does not vary as the thyristor 6 turns on and off.

Figure 3:
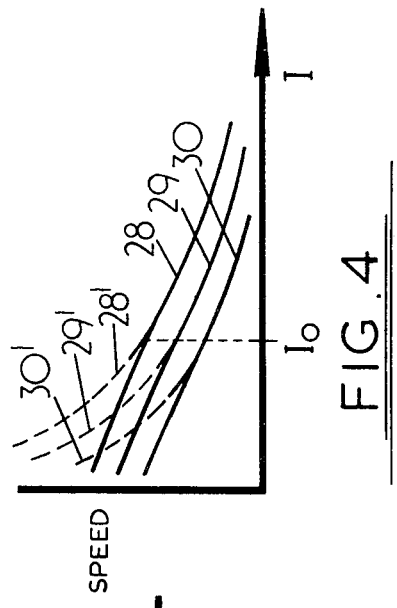
FIGS. 3 and 4 are diagrams illustrating the operation of the controller illustrated in FIG. 2.
Figure 4:
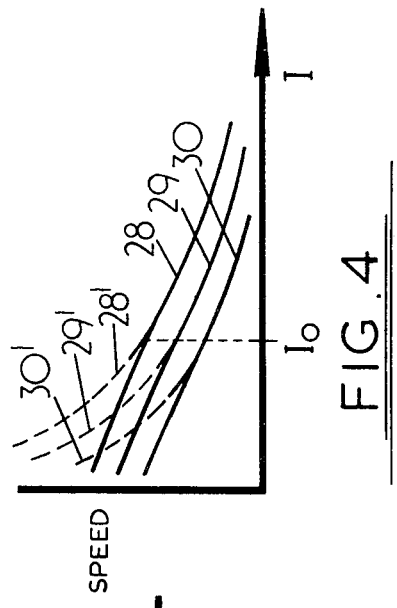

FIGS. 3 and 4 illustrate mark/space and speed versus current curves 28, 29 and 30 for three different settings of the wiper 9 of the potentiometer, the curve 28 representing the maximum setting possible. The curves which would be followed at currents below Io if the circuitry were conventional are indicated as 28', 29' and 30'.

Figure 5:
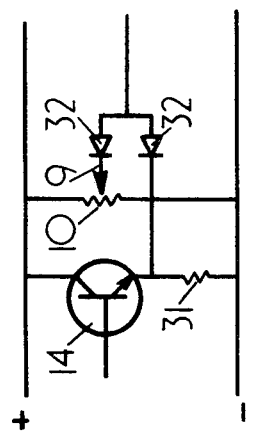
FIG. 5 is a circuit diagram illustrating a modification which may be made to the controller illustrated in FIG. 2.

Referring now to FIG. 5, an alternative arrangement of the potentiometer of FIG. 2 is shown with equivalent components bearing the same reference numerals. The track 10 is connected between positive and negative rails and a further signal is derived from the emitter of the transistor 14 which is connected to the negative rail by a resistor 31. The output to section II is selected by diodes 32 which automatically select the least positive voltage signal applied to them.

Figure 7:
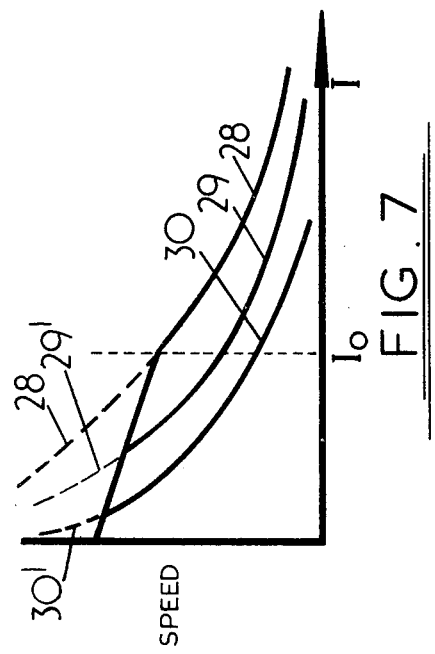
FIGS. 6 and 7 are diagrams illustrating the operation of the modified controller as illustrated in FIGS. 2 and 5.
Figure 6:
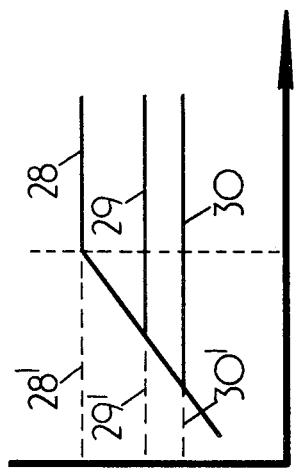

The mark/space ratio and speed versus current curves obtained with the FIG. 5 modification as shown in FIGS. 6 and 7. The curves 28, 29 and 30 again illustrate three different settings of the potentiometer wiper 9. It will be seen that the curves 29, 30 extend to and then follow the curve 28 at currents below Io, contrasting with the curves of FIGS. 3 and 4.

It will be appreciated that the action of the current-dependent signal on the maximum mark/space ratio can be limited if desired. For example, the selection by an operator of some operation could automatically actuate the mark/space ratio limiting action, whilst other operations do not. The mark/space ratio limit may be applied for predetermined time periods, and/or for temperatures above a predetermined value.

What is claimed is:

1. A control circuit for controlling the energization of a series electric motor from a D.C. source, comprising:
    a semi-conductor switching element connected in series with the motor,
    a pulse generator circuit for applying a train of pulses to the semi-conductor switching element such that the switching element is turned on and off and thereby applies D.C. pulses to the motor,
    means for controlling the pulse generator circuit to determine the mark/space ratio of the D.C. pulses applied to the motor.
    means for sensing the current through the motor, and
    means for adjustably setting and applying the maximum mark/space ratio such that when the motor current is below a predetermined limit the maximum mark/space ratio is proportional to motor current and when the motor current is above the predetermined limit the maximum mark/space ratio is independent of motor current.

2. A controller according to claim 1, wherein the maximum mark/space ratio reducing means is effective to make the maximum mark/space ratio proportional to motor current when the current is below the said predetermined limit.

3. A controller according to claim 2, wherein the maximum mark/space ratio reducing means comprises a transistor controlled by a signal responsive to motor current, the transistor controlling current through a resistor the potential difference across which is utilized as an input to the mark/space ratio controlling means.

4. A controller according to claim 3, wherein the said resistor comprises the track of a potentiometer the wiper of which is connected to the mark/space ratio controlling means.

5. A controller according to claim 3, wherein the said resistor is of a fixed ohmic resistance, and a potentiometer is provided with its track connected across a fixed potential, the potential appearing across said resistor and the potential at the wiper of the potentiometer being applied alternately via respective diodes to the input to the mark/space ratio controlling means.

6. A controller according to claim 1, wherein the motor current sensing means comprises a low ohmic value resistor in series with the motor.

* * * * *